United States Patent
Luo et al.

(10) Patent No.: US 11,796,686 B2
(45) Date of Patent: Oct. 24, 2023

(54) POSITIONING DATA PROCESSING METHOD AND PROCESSING APPARATUS, COMPUTING DEVICE, AND STORAGE MEDIUM

(71) Applicant: Tencent Technology (Shenzhen) Company Limited, Shenzhen (CN)

(72) Inventors: Yuanhao Luo, Shenzhen (CN); Bingguo Li, Shenzhen (CN); Ming Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 652 days.

(21) Appl. No.: 17/017,515

(22) Filed: Sep. 10, 2020

(65) Prior Publication Data

US 2020/0408925 A1 Dec. 31, 2020

Related U.S. Application Data (63) Continuation of application No. PCT/CN2019/102211, filed on Aug. 23, 2019.

(30) Foreign Application Priority Data

Aug. 27, 2018 (CN) .......................... 201810981602.8

(51) Int. Cl.
*G01S 19/37* (2010.01)
*G01S 19/40* (2010.01)
(Continued)

(52) U.S. Cl.
CPC .......... *G01S 19/37* (2013.01); *G01C 21/3415* (2013.01); *G01S 19/40* (2013.01)

(58) Field of Classification Search
CPC .......... G01S 19/37; G01S 19/40; G01S 19/14; G01S 19/393; G01S 19/50; G01C 21/3415; G01C 21/20
See application file for complete search history.

(56) References Cited

U.S. PATENT DOCUMENTS

| 6,297,769 | B1 * | 10/2001 | Deines | ................... | G01S 19/54 |
| | | | | | 342/357.65 |
| 6,336,061 | B1 * | 1/2002 | Deines | ................... | G01S 19/55 |
| | | | | | 701/13 |

(Continued)

FOREIGN PATENT DOCUMENTS

| CN | 102928858 A | 2/2013 |
| CN | 104596530 A | 5/2015 |

(Continued)

OTHER PUBLICATIONS

Tencent Technology, ISR, PCT/CN2019/102211, Nov. 4, 2019, 2 pgs.

(Continued)

*Primary Examiner* — Yonel Beaulieu
(74) *Attorney, Agent, or Firm* — Morgan, Lewis & Bockius LLP (57) ABSTRACT

This application discloses a positioning data processing method performed at a computing device. The method includes: obtaining a first positioning data sequence generated by a moving target chronologically; performing filtering processing on the first positioning data sequence according to a preset filtering algorithm to obtain a filtered data sequence, and performing adsorption calculation on the filtered data sequence to obtain an adsorption data sequence, the preset filtering algorithm being an algorithm obtained after a Kalman filtering algorithm is corrected according to the adsorption data sequence; outputting the filtered data sequence to obtain a second positioning data sequence of the (Continued)

moving target; and displaying a position corresponding to second positioning data in the second positioning data sequence. The adsorption data sequence is used to correct the Kalman filtering algorithm such that a positioning offset of the moving target is eliminated, thereby improving accuracy of positioning and navigation.

20 Claims, 6 Drawing Sheets

(51) Int. Cl.
*G01C 21/34* (2006.01)
*G01C 21/20* (2006.01)
*G01S 19/50* (2010.01)

(56) References Cited

U.S. PATENT DOCUMENTS

| | | | |
|---|---|---|---|
| 7,626,534 B1* | 12/2009 | Boka | G01S 13/726 342/451 |
| 8,120,527 B2* | 2/2012 | Ashjaee | G01S 19/54 342/357.27 |
| 2007/0218931 A1* | 9/2007 | Beadle | H04W 56/0075 455/502 |
| 2009/0167603 A1 | 7/2009 | Muraguchi | |
| 2009/0189804 A1* | 7/2009 | Ashjaee | G01S 19/14 342/357.27 |
| 2011/0178705 A1 | 7/2011 | Pakzad et al. | |
| 2021/0311205 A1* | 10/2021 | Davidson | G05D 1/106 |

FOREIGN PATENT DOCUMENTS

| | | | |
|---|---|---|---|
| CN | 104613972 A | 5/2015 | |
| CN | 107525507 A | 12/2017 | |
| CN | 107807373 A | 3/2018 | |
| CN | 108241161 A | 7/2018 | |
| EP | 1838013 A2 * | 9/2007 | H04B 7/18589 |
| EP | 2570771 A1 | 3/2013 | |
| WO | WO 9700424 A1 | 1/1997 | |

OTHER PUBLICATIONS

Extended European Search Report, EP19856027.8, dated Jul. 16, 2021, 10 pgs.
Tencent Technology, WO, PCT/CN2019/102211, Nov. 4, 2019, 4 pgs.
Tencent Technology, IPRP, PCT/CN2019/102211, Mar. 2, 2021, 5 pgs.

* cited by examiner

POSITIONING DATA PROCESSING METHOD AND PROCESSING APPARATUS, COMPUTING DEVICE, AND STORAGE MEDIUM

CROSS-REFERENCE TO RELATED APPLICATIONS

This application is a continuation application of PCT Patent Application No. PCT/CN2019/102211, entitled "PROCESSING METHOD AND PROCESSING APPARATUS FOR POSITIONING DATA, COMPUTING DEVICE AND STORAGE MEDIUM" filed on Aug. 23, 2019, which claims priority to Chinese Patent Application No. 201810981602.8, entitled "POSITIONING DATA PROCESSING METHOD AND PROCESSING APPARATUS, TERMINAL DEVICE, AND STORAGE MEDIUM" filed on Aug. 27, 2018, all of which are incorporated by reference in their entirety.

FIELD OF THE TECHNOLOGY

This application relates to the field of navigation technologies, and in particular, to a positioning data processing method and processing apparatus, a computing device, and a storage medium.

BACKGROUND OF THE DISCLOSURE

In the related art, positioning algorithms commonly used in the positioning field based on the Global Positioning System (GPS) include the least square method, an extended Kalman filtering algorithm, a second-order extended Kalman filtering algorithm, and the like. In the least square method, a point having a minimum Euclidean distance is taken as an estimation of current positioning through linear fitting. The Kalman filtering algorithm first predicts a current position, speed, GPS receiver clock difference, and the like of a target according to a state equation. Then, based on the predicted prior estimated values of the state and a satellite position and velocity provided by the satellite ephemeris, a Kalman filter can predict a pseudorange and a Doppler offset value between the GPS receiver and each satellite. Differences between such measurement values and actual measurement values (observation values) of the receiver form measurement residuals. Finally, the Kalman filter processes the measurement residuals to obtain a correction value of an estimated value of a system state and an optimal estimated value after the correction.

The least square method is the most basic and the simplest positioning algorithm. However, in cases such as dynamic multipath, a positioning effect of the least square method is extremely unsatisfactory. The Kalman filtering algorithm performs iterative calculation on GPS positioning data generated chronologically. Although the problem of unsatisfactory positioning effect of the least square method in scenarios such as multipath effects is resolved, because the algorithm uses a previous optimal estimated value as a calculation basis of a current predicted prior estimated value, error accumulation cannot be avoided. In a case of GPS slowly deviating from the route, an existing Kalman filtering algorithm cannot effectively resolve the problem of slow GPS drift due to the error accumulation, and the positioning effect is not satisfactory.

SUMMARY

Implementations of this application provide a positioning data processing method and processing apparatus, a computing device, and a storage medium.

The positioning data processing method in the implementations of this application includes: obtaining a first positioning data sequence generated by a moving target chronologically; performing filtering processing on the first positioning data sequence according to a preset filtering algorithm to obtain a filtered data sequence, and performing adsorption calculation on the filtered data sequence to obtain an adsorption data sequence, the preset filtering algorithm being an algorithm obtained after a Kalman filtering algorithm is corrected according to the adsorption data sequence; outputting the filtered data sequence to obtain a second positioning data sequence of the moving target; and displaying a position corresponding to second positioning data in the second positioning data sequence.

The positioning data processing apparatus in the implementations of this application includes: an obtaining unit, configured to obtain a first positioning data sequence generated by a moving target chronologically; a processing unit, configured to perform filtering processing on the first positioning data sequence according to a preset filtering algorithm to obtain a filtered data sequence, and perform adsorption calculation on the filtered data sequence to obtain an adsorption data sequence, the preset filtering algorithm being an algorithm obtained after a Kalman filtering algorithm is corrected according to the adsorption data sequence; and an output unit, configured to output the filtered data sequence to obtain a second positioning data sequence of the moving target, and display a position corresponding to second positioning data in the second positioning data sequence.

The computing device in the implementations of this application includes a memory and a processor, the memory storing an executable program, the executable program, when executed by the processor, causing the processor to perform the positioning data processing method in the foregoing implementation.

The computer-readable storage medium in the implementations of this application stores an executable program, the executable program, when executed by a processor, causing the processor to perform the positioning data processing method in the foregoing implementation.

According to the positioning data processing method and processing apparatus, the computing device, and the computer-readable storage medium in the implementations of this application, filtering processing is performed on the first positioning data sequence according to the preset filtering algorithm to obtain the filtered data sequence, and adsorption calculation is performed on the filtered data sequence. The adsorption data sequence obtained through adsorption calculation is used to correct the Kalman filtering algorithm. In a process of chronological recursive calculation, the filtered data sequence may be outputted to obtain the second positioning data sequence of the moving target, and the position corresponding to the second positioning data in the second positioning data sequence is displayed. In the outputted second positioning data sequence, a positioning offset of the moving target is eliminated to some extent, and in particular, an adverse impact of error accumulation caused by the slow positioning offset is eliminated, so that the position corresponding to the second positioning data in the second positioning data sequence accurately reflects an actual position of the moving target, thereby improving accuracy of positioning and navigation, and improving user satisfaction with positioning and navigation products, for example, an in-vehicle navigation product and a mobile terminal.

Additional aspects and advantages of the implementations of this application will be given in the following descriptions, some of which will become apparent from the following descriptions or may be learned through practices of the implementations of this application.

BRIEF DESCRIPTION OF THE DRAWINGS

The foregoing and/or additional aspects and advantages of this application will become apparent and comprehensible from the descriptions of the implementations below with reference to the accompanying drawings.

LIST OF REFERENCE NUMERALS

Terminal 100, positioning data processing apparatus 10, obtaining unit 12, processing unit 14, adsorption module 142, filtering module 144, output unit 16, initialization unit 18, positioning system 200, server 300, terminal device 400, memory 410, processor 420.

DESCRIPTION OF EMBODIMENTS

The following describes implementations of this application in detail. Examples of the implementations are shown in the accompanying drawings, and same or similar reference signs in all the accompanying drawings indicate same or similar components or components having same or similar functions. The implementations that are described with reference to the accompany drawings are exemplary, and are only used to explain this application and cannot be construed as a limitation to this application.

Many different implementations or examples are provided below to implement different structures of this application. To simplify the disclosure of this application, the following describes components and settings of particular examples. Certainly, the components and settings are merely examples, and are not intended to limit this application. In addition, in this application, reference numbers and/or reference letters may be repeated in different examples. Such repetition is intended to simplify and clarify this application, and does not indicate a relationship between various implementations and/or settings that are discussed.

Figure 1:
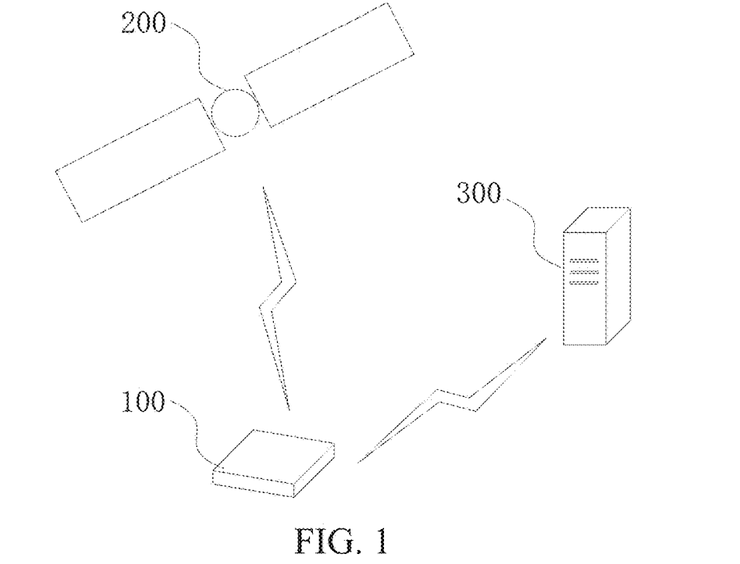
FIG. 1 is a schematic diagram of a hardware environment according to an implementation of this application.

Referring to FIG. 1, a positioning data processing method in the implementations of this application may be applied to a hardware environment and/or a software environment including a positioning system 200, a server 300, and a terminal 100. The terminal 100 may obtain positioning data from the positioning system 200. The terminal 100 may be connected to the positioning system 200 and the server 300 through a wired or wireless network. The network includes but is not limited to a wide area network, a metropolitan area network, or a local area network. The terminal 100 includes but is not limited to a PC, a mobile phone, a tablet computer, an in-vehicle terminal, and the like. The in-vehicle terminal is, for example, an in-vehicle navigation device. The positioning data processing method in this embodiment of this application may be performed by the server 300, or may be performed by the terminal 100, or may be performed by both the server 300 and the terminal 100. When the terminal 100 performs the positioning data processing method in this embodiment of this application, client application software may be installed on the terminal 100 to perform the method together. The client application software may be navigation software or map software. In this embodiment of this application, the terminal 100 and the server 300 may also be referred to as computing devices.

Figure 2:
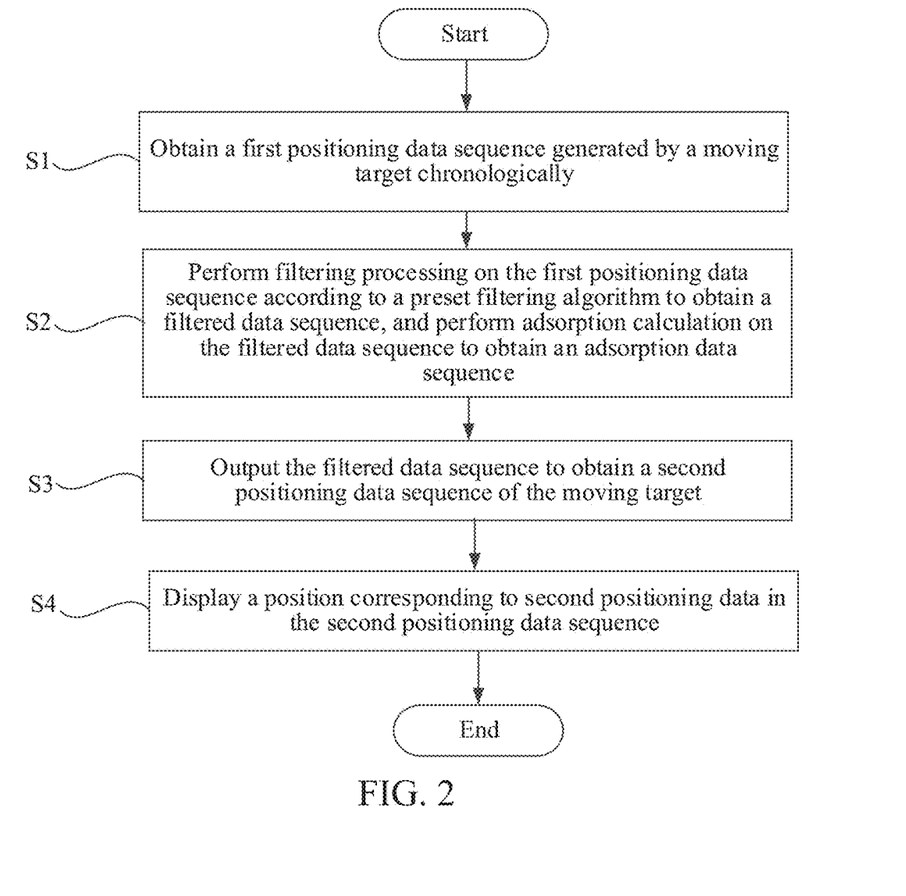
FIG. 2 is a flowchart of a positioning data processing method according to an implementation of this application.
Figure 3:
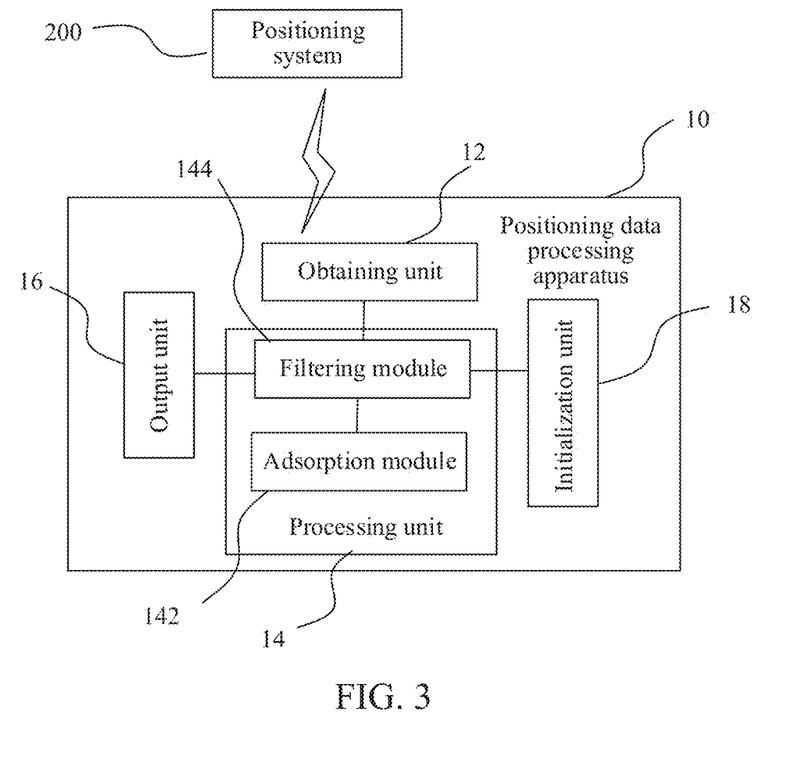
FIG. 3 is a schematic diagram of modules of a positioning data processing apparatus according to an implementation of this application.

Referring to FIG. 2 and FIG. 3, the positioning data processing method in the implementations of this application includes:

Step S1: Obtain a first positioning data sequence generated by a moving target chronologically.

Step S2: Perform filtering processing on the first positioning data sequence according to a preset filtering algorithm to obtain a filtered data sequence, and perform adsorption calculation on the filtered data sequence to obtain an adsorption data sequence, the preset filtering algorithm being an algorithm obtained after a Kalman filtering algorithm is corrected according to the adsorption data sequence.

Step S3: Output the filtered data sequence to obtain a second positioning data sequence of the moving target.

Step S4: Display a position corresponding to second positioning data in the second positioning data sequence.

The positioning data processing method in the implementations of this application may be applied to a positioning data processing apparatus 10 in the implementations of this application, that is, the positioning data processing apparatus 10 in the implementations of this application may process the first positioning data sequence by using the positioning data processing method in the implementations of this application to obtain the second positioning data sequence of the moving target, to obtain more accurate positioning information of the moving target. In this embodiment of this application, the positioning data processing apparatus 10 may be an independent computing device having a positioning data processing function, for example, a terminal device or a server, or may be a component installed in a computing device, and a positioning data processing function thereof is implemented by running the computing device. In this embodiment of this application, the independent terminal device may be an in-vehicle navigation device or another device having a navigation function.

The positioning data processing apparatus 10 in the implementations of this application includes an obtaining unit 12, a processing unit 14, and an output unit 16. The obtaining unit 12 is configured to obtain a first positioning data sequence generated by a moving target chronologically. The processing unit 14 is configured to perform filtering processing on the first positioning data sequence according to a preset filtering algorithm to obtain a filtered data sequence, and perform adsorption calculation on the filtered data sequence to obtain an adsorption data sequence. The output unit 16 is configured to output the filtered data sequence to obtain a second positioning data sequence of the moving target.

Specifically, the obtaining unit 12 may implement step S1 by positioning the moving target through the GPS in a moving process of the moving target. To be specific, the obtaining unit 12 may send a positioning instruction to the GPS positioning system (for example, the positioning system 200), receive positioning data returned by the GPS positioning system, that is, obtain the first positioning data sequence generated by the moving target chronologically, and send the first positioning data sequence to the processing unit 14. The first positioning data sequence includes first positioning data of a plurality of timings. The first positioning data includes data such as a moving speed, a deflection angle, first position data (for example, a longitude and a latitude), and positioning accuracy of the moving target.

A GPS signal may be interfered by the atmosphere, an error may exist in a satellite clock, and there may be a multipath effect, resulting in noise in the positioning data. Therefore, the processing unit 14 may perform, by implementing step S2, filtering processing on the first positioning data sequence obtained by the obtaining unit 12, to reduce the noise in the first positioning data. The processing unit 14 sequentially performs filtering processing on the first positioning data in the first positioning data sequence generated chronologically, to obtain the filtered data sequence.

Further, the processing unit 14 may perform adsorption calculation on the filtered data sequence, and the adsorption data sequence obtained through adsorption calculation is used to correct the Kalman filtering algorithm, so that noise of the filtered data sequence obtained through filtering processing is reduced in a process of chronological recursive calculation, and filtered data is sent to the output unit 16. The output unit 16 may implement step S3, that is, output the filtered data sequence to obtain the second positioning data sequence of the moving target. Further, the output unit 16 outputs the second positioning data sequence to a display apparatus of a terminal device, and the display apparatus displays the position corresponding to the second positioning data in the second positioning data sequence. In this embodiment of this application, the display apparatus may be a part of the output unit 16, and the step of displaying the position corresponding to the second positioning data may be performed by the display apparatus after the display apparatus receives the second positioning data sequence, or may be performed after the display apparatus receives an instruction inputted by a user by using an input device such as a key or a touchscreen. In the outputted second positioning data sequence, a positioning offset of the moving target is eliminated to some extent, and in particular, an adverse impact of error accumulation caused by the slow positioning offset is eliminated, so that the position corresponding to the second positioning data in the second positioning data sequence accurately reflects an actual position of the moving target, thereby improving accuracy of positioning and navigation, and improving user satisfaction with positioning and navigation products, for example, an in-vehicle navigation device and a mobile terminal.

In an embodiment, the first positioning data sequence may be an original positioning data sequence, that is, the original positioning data sequence obtained by using the GPS positioning system, and the first positioning data may be original positioning data. The second positioning data sequence may be a positioning data sequence obtained after filtering processing is performed on the first positioning data sequence by using the preset filtering algorithm, and the second positioning data may be positioning data obtained after filtering processing is performed on the first positioning data by using the preset filtering algorithm.

The Kalman filtering algorithm is a linear system state equation, and is an algorithm of inputting observation data to a system, processing the observation data, and then outputting a processing result, to implement optimal estimation of the system. The observation data includes noise in the system, and therefore the optimal estimation is a process of filtering the noise signal in the system.

In an original Kalman filtering algorithm, prediction calculation is performed according to an optimal estimated value obtained in a previous round of filtering processing to obtain a predicted prior estimated value of current filtering processing. However, the predicted prior estimated value obtained through prediction in this way has uncertainty. Therefore, the optimal estimated value after the filtering may be obtained through calculation by using observation data obtained in the current filtering processing and the predicted prior estimated value of the current filtering processing. In filtering processing on the positioning data, the optimal estimated value is a filtering result of the positioning data, so that noise of the positioning data is reduced after the filtering.

In the first positioning data sequence having the plurality of timings, the process of performing filtering processing on the first positioning data by using the Kalman filtering algorithm is performing iterative calculation on the first positioning data.

In the positioning data processing method in this application, the Kalman filtering algorithm is corrected according to the adsorption data sequence, so that in the process of performing filtering on the first positioning data sequence by using the Kalman filtering algorithm, the error accumulation generated due to slow GPS drift is further reduced, and the obtained second positioning data sequence is more accurate, helping improve positioning accuracy.

Some functions of the positioning data processing apparatus 10 may be implemented by the server 300 or the terminal 100, and other functions may be implemented by the terminal 100 or the server 300, or other functions are implemented by a device independent of the server 300 and the terminal 100. Alternatively, all functions of the positioning data processing apparatus 10 may be independently implemented by the server 300 or the terminal 100, or may be implemented by a device independent of the server 300 and the terminal 100.

The first positioning data sequence may include j pieces of first positioning data generated in j timings, j is a natural number greater than or equal to 2. When the first positioning data sequence is filtered, the following Kalman model and equation may be established:

$$x_k = F_k x_{k-1} + B_k u_k + w_k$$

$x_k$ is an optimal estimated value of a $k^{th}$ timing of a system state, $x_{k-1}$ is an optimal estimated value of the $(k-1)^{th}$ timing of the system state, $F_k$ is a state transition model, $B_k$ is a system control input of the $k^{th}$ timing, $u_k$ is a system control vector of the $k^{th}$ timing, and $w_k$ is process noise, where k is a natural number and $1<k\leq j$.

The following observation model and equation is established:

$$z_k = H_k x_k + v_k$$

$z_k$ is an observation value of a real value $x_k$ of a system state in a real state space of the $k^{th}$ timing, $H_k$ is an observation model, and $v_k$ is observation noise.

In some implementations, the first positioning data sequence includes a first position data sequence, and step S2 includes:

performing filtering processing on the first position data sequence according to the preset filtering algorithm to obtain the filtered data sequence, and performing adsorption calculation on the filtered data sequence to obtain the adsorption data sequence.

In this way, the first position data sequence of the moving target may be filtered, for example, the longitude and latitude of the moving target are filtered, to reduce noise of the first position data of the moving target.

For the positioning data processing apparatus 10, the processing unit 14 may be configured to perform filtering processing on the first position data sequence according to the preset filtering algorithm to obtain the filtered data sequence, and perform adsorption calculation on the filtered data sequence to obtain the adsorption data sequence.

That is, in the implementations of this application, the first position data of the moving target may be filtered, and the filtered data includes filtered position data. The optimal estimated value $x_k$ of the $k^{th}$ timing and the optimal estimated value $x_{k-1}$ of the $(k-1)^{th}$ timing are respectively filtered position data of the $k^{th}$ timing and filtered position data of the $(k-1)^{th}$ timing of the moving target. Specifically, the first position data and the filtered position data may be the longitude and latitude of the moving target, and filtering calculation is performed in the form of a two-dimensional matrix in the Kalman filtering algorithm.

The state transition model $H_k$ acts on the optimal estimated value $x_{k-1}$ of the position data of the moving target in the $(k-1)^{th}$ timing. Adsorption data obtained through adsorption calculation in the $(k-1)^{th}$ timing and a displacement calculated according to a moving speed and a deflection angle of the moving target in the $(k-1)^{th}$ timing may be used as the system control input $B_k$ to act on the control vector $u_k$. That is, in the implementations of this application, the Kalman model and equation is corrected according to the adsorption data. Specifically, the Kalman model and equation of the $k^{th}$ timing is corrected according to the adsorption data obtained through calculation in the $(k-1)^{th}$ timing, and then filtering processing is performed on the first positioning data of the $k^{th}$ timing.

In the filtering process, it is assumed that the process noise $w_k$ is normally distributed and a mean value thereof is 0, and an error covariance of the process noise is $Q_k$, that is, $w_k \sim \aleph(0, Q_k)$. The error covariance of the process noise is uncertainty of the process noise.

In the observation equation, the observation value $z_k$ of the position data of the moving target may be regarded as an observation value obtained by mapping the real value $x_k$ of the position data of the moving target in the real state space to an observation space by using the observation model $H_k$. In the filtering process, it is assumed that the observation noise $v_k$ is normally distributed and a mean value thereof is 0, and an error covariance of the observation noise is $R_k$, that is, $v_k \sim \aleph(0, R)$. The error covariance of the observation noise is uncertainty of the observation noise.

Figure 4:
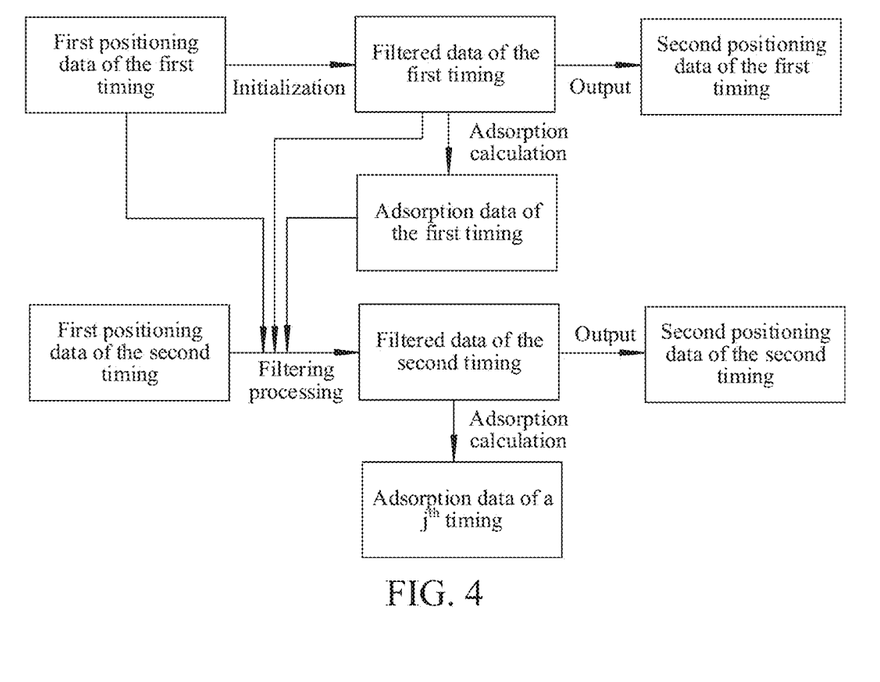
FIG. 4 is another flowchart of a positioning data processing method according to an implementation of this application.

Referring to FIG. 4, in some implementations, the filtered data of the first timing may be obtained by using the first positioning data of the first timing, and the adsorption data of the first timing may be obtained through adsorption calculation by using the filtered data of the first timing.

For the positioning data processing apparatus 10, the positioning data processing apparatus 10 includes an initialization unit 18, and the processing unit 14 includes an adsorption module 142. The initialization unit 18 may be configured to obtain the filtered data of the first timing by using the first positioning data of the first timing. The first timing is a timing corresponding to the first piece of positioning data in the positioning data sequence obtained by the obtaining unit 12 chronologically. The adsorption module 142 may be configured to perform adsorption calculation by using the filtered data of the first timing to obtain the adsorption data of the first timing.

In some implementations, the filtered data includes an optimal estimated value and an error covariance of the optimal estimated value. The second positioning data sequence may be obtained by sequentially outputting the optimal estimated value of each timing.

For the positioning data processing apparatus 10, the initialization unit 18 may be configured to obtain the optimal estimated value of the first timing and the error covariance of the optimal estimated value of the first timing by using the first positioning data of the first timing. Then, the output unit 16 may output the optimal estimated value of the first timing as the second positioning data of the first timing.

Specifically, the adsorption module 142 may be configured to perform adsorption calculation by using the optimal estimated value of the first timing to obtain the adsorption data of the first timing. The processing unit 14 may use the filtered data of the first timing for filtering processing of the first positioning data of the second timing. When performing filtering processing on the first positioning data of the second timing, the processing unit 14 uses the adsorption data to correct the Kalman filtering algorithm.

It may be understood that, in the positioning data processing process, when filtering processing is performed on the first positioning data of the first timing, there is no filtered data or adsorption data related to the previous round of filtering processing of the first positioning data. Therefore, the initialization unit 18 may obtain the optimal estimated value of the first timing and the error covariance of the optimal estimated value of the first timing by using the first positioning data of the first timing, that is, set the optimal estimated value of the first timing and the error covariance of the optimal estimated value of the first timing according to the first positioning data of the first timing.

Specifically, the optimal estimated value of the first timing is set as follows:

$$\hat{x}_{k|k} = \begin{pmatrix} m \\ n \end{pmatrix}$$

m and n are respectively a longitude and a latitude of the moving target in the first timing.

The error covariance of the optimal estimated value of the first timing is set as follows:

$$P_{k|k} = \begin{bmatrix} p*p & 0 \\ 0 & p*p \end{bmatrix}$$

p is positioning accuracy of GPS positioning data of the moving target in the first timing.

In some implementations, the initialization unit 18 is configured to initialize the state transition model, the observation model, and the error covariance of the process noise according to empirical values and statistical values.

It may be understood that, in the Kalman filtering process, filtering calculation is performed on the first positioning data of each timing by using the state transition model, the observation model, and the error covariance of the process noise. Moreover, the state transition model, the observation model, and the error covariance of the process noise all remain unchanged in the process of recursive calculation. Therefore, the initialization unit 18 may initialize the state transition model, the observation model, and the error covariance of the process noise to determine values thereof, helping the processing unit 14 to perform filtering processing on the first positioning data.

Specifically, the state transition model is initialized as follows:

$$F_k = \begin{bmatrix} 1 & 0 \\ 0 & 1 \end{bmatrix}$$

The observation model is initialized as follows:

$$H_k = \begin{bmatrix} 1 & 0 \\ 0 & 1 \end{bmatrix}$$

The error covariance of the process noise is initialized as follows:

$$Q_0 = \begin{bmatrix} 100 & 0 \\ 0 & 100 \end{bmatrix}$$

The state transition model, the observation model, and the error covariance of the process noise are determined according to empirical values and statistical values. The initialization results of the state transition model, the observation model, and the error covariance of the process noise are merely used as an embodiment, and cannot be construed as a limitation to this application. In other implementations, values of the state transition model, the observation model, and the error covariance of the process noise may be changed according to an actual requirement. This is not specifically limited herein.

Figure 5:
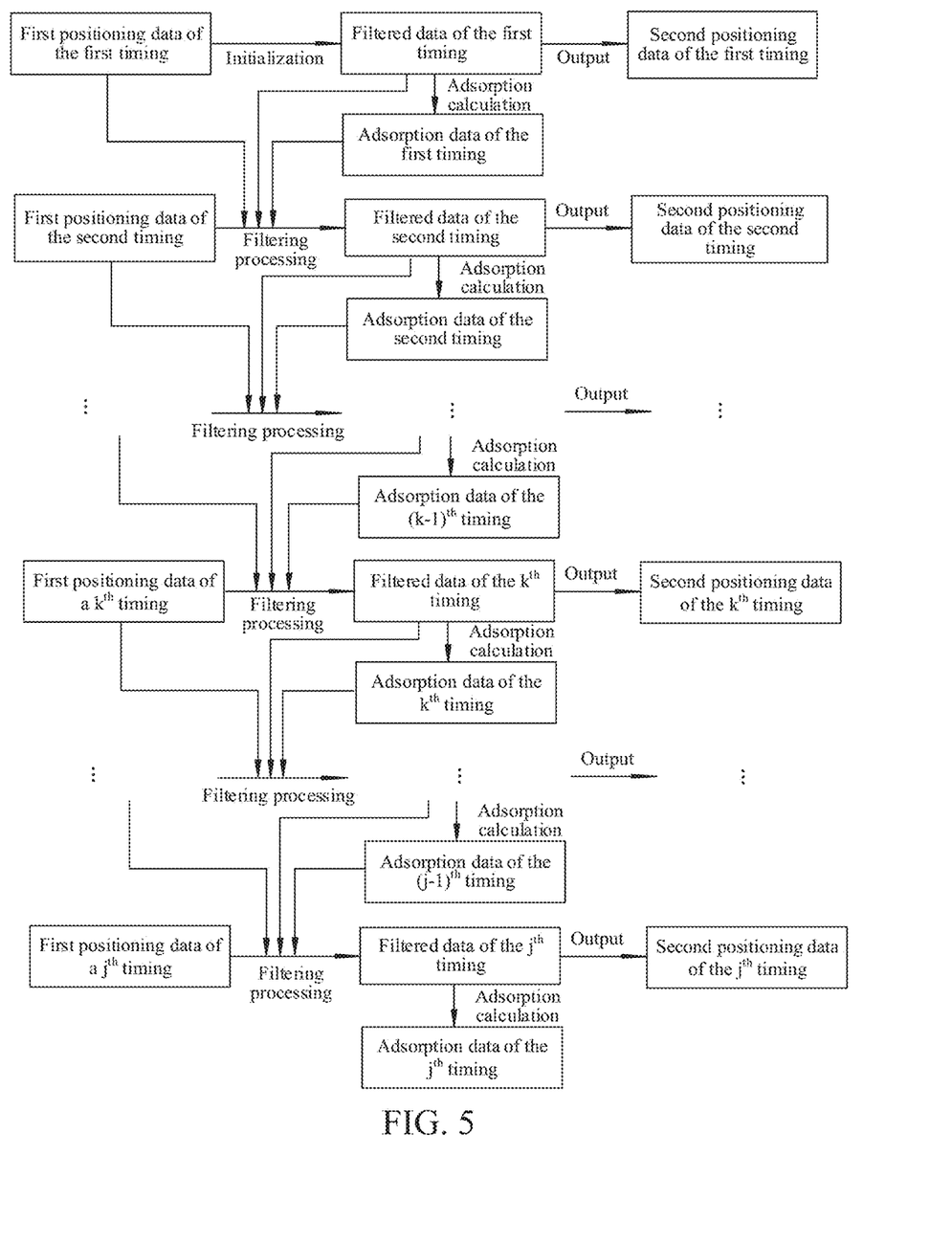
FIG. 5 is still another flowchart of a positioning data processing method according to an implementation of this application.
Figure 6:
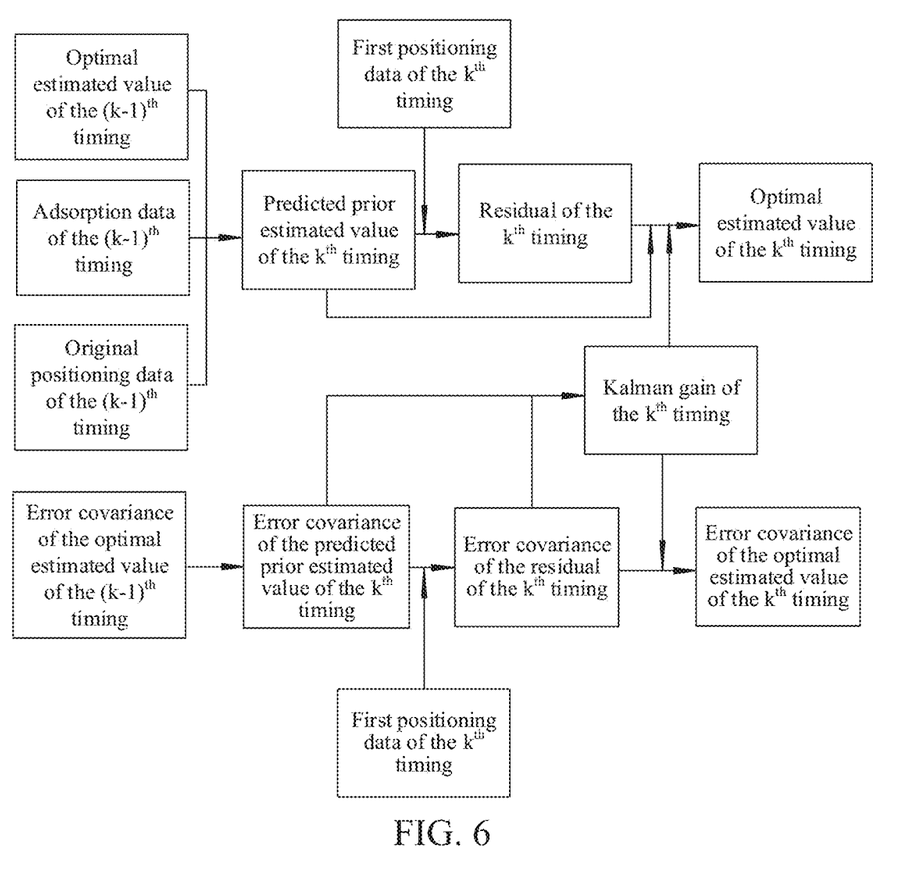
FIG. 6 is yet another flowchart of a positioning data processing method according to an implementation of this application.

Referring to FIG. 5 and FIG. 6, in some implementations, the filtered data of the $k^{th}$ timing may be obtained through calculation by using the first positioning data of the $k^{th}$ timing, the first positioning data of the $(k-1)^{th}$ timing, the filtered data of the $(k-1)^{th}$ timing, and the adsorption data of the $(k-1)^{th}$ timing and by using the Kalman filtering algorithm. The adsorption data of the $k^{th}$ timing may be obtained through adsorption calculation by using the filtered data of the $k^{th}$ timing.

For the positioning data processing apparatus 10, the processing unit 14 includes a filtering module 144. The filtering module 144 is configured to obtain the filtered data of the $k^{th}$ timing through calculation by using the first positioning data of the $k^{th}$ timing, the first positioning data of the $(k-1)^{th}$ timing, the filtered data of the $(k-1)^{th}$ timing, and the adsorption data of the $(k-1)^{th}$ timing and by using the Kalman filtering algorithm. The adsorption module 142 is configured to perform adsorption calculation by using the filtered data of the $k^{th}$ timing to obtain the adsorption data of the $k^{th}$ timing. In the process of recursive calculation, the processing unit 14 uses the adsorption data to correct the Kalman filtering algorithm.

For example, the filtered data of the second timing may be obtained through calculation by the filtering module 144 by using the first positioning data of the second timing, the filtered data of the first timing, and the adsorption data of the first timing and by using the Kalman filtering algorithm. The adsorption data of the second timing may be obtained through adsorption calculation by the adsorption module 142 by using the filtered data of the second timing.

In some implementations, the output unit 16 may output the optimal estimated value of the $k^{th}$ timing as the second positioning data of the $k^{th}$ timing. In this case, the output unit 16 sequentially outputs the optimal estimated value of each timing of the filtered data sequence chronologically to obtain the second positioning data of the moving target.

Referring to FIG. 6, in some implementations, the filtered data includes a predicted prior estimated value, an error covariance of the predicted prior estimated value, and a Kalman gain. The predicted prior estimated value of the $k^{th}$ timing may be obtained through calculation by using the first position data of the $(k-1)^{th}$ timing, the optimal estimated value of the $(k-1)^{th}$ timing, and the adsorption data of the $(k-1)^{th}$ timing.

The error covariance of the predicted prior estimated value of the $k^{th}$ timing may be obtained through calculation by using the error covariance of the optimal estimated value of the $(k-1)^{th}$ timing.

For the positioning data processing apparatus 10, the filtering module 144 may be configured to obtain the predicted prior estimated value of the $k^{th}$ timing through calculation by using the first position data of the $(k-1)^{th}$ timing, the optimal estimated value of the $(k-1)^{th}$ timing, and the adsorption data of the $(k-1)^{th}$ timing and by using the foregoing Kalman model and equation, that is, the processing unit 14 uses the adsorption data of the $(k-1)^{th}$ timing to correct the Kalman filtering algorithm, to perform filtering processing on the first position data of the $k^{th}$ timing.

The filtering module 144 may be configured to obtain the error covariance of the predicted prior estimated value of the $k^{th}$ timing through calculation by using the error covariance of the optimal estimated value of the $(k-1)^{th}$ timing and by using the foregoing Kalman model and equation, to estimate uncertainty of the predicted prior estimated value of the $k^{th}$ timing.

Specifically, the predicted prior estimated value of the $k^{th}$ timing is calculated according to the following equation:

$$\hat{x}_{k|k-1} = F_k \hat{x}_{k-1|k-1} + B_k u_k$$

$\hat{x}_{k|k-1}$ is the predicted prior estimated value of the $k^{th}$ timing of the moving target, and $\hat{x}_{k-1|k-1}$ is the optimal estimated value of the $(k-1)^{th}$ timing of the moving target. The moving speed and the deflection angle of the moving target in the first positioning data of the $(k-1)^{th}$ timing and the adsorption data of the $(k-1)^{th}$ timing may be used as the system control input $B_k$ to act on the control vector $u_k$. That is, the Kalman filtering algorithm is corrected by using the adsorption data. In the calculation process, it is assumed that a value of the process noise is 0, and the error covariance of the process noise is $Q_k$.

Further, the error covariance of the predicted prior estimated value of the $k^{th}$ timing is calculated according to the following equation:

$$P_{k|k-1}=F_k P_{k-1|k-1} F_k^T + Q_k$$

$P_{k|k-1}$ is the error covariance of the predicted prior estimated value $\hat{x}_{k|k-1}$ of the $k^{th}$ timing of the moving target, and $P_{k-1|k-1}$ is the error covariance of the optimal estimated value $\hat{x}_{k-1|k-1}$ of the $(k-1)^{th}$ timing of the moving target, where the error covariance of the process noise is:

$$Q_k = Q_0 = \begin{bmatrix} 100 & 0 \\ 0 & 100 \end{bmatrix}$$

That is, the error covariance of the process noise remains unchanged in the process of iterative calculation of the first positioning data.

The filtering module 144 is configured to obtain the predicted prior estimated value of the $k^{th}$ timing of the moving target and the error covariance of the predicted prior estimated value of the $k^{th}$ timing through calculation by using the foregoing equations.

In some implementations, the filtered data includes a residual and an error covariance of the residual. The residual of the $k^{th}$ timing may be obtained through calculation by using the first positioning data of the $k^{th}$ timing and the predicted prior estimated value of the $k^{th}$ timing and by using the observation model.

The error covariance of the residual of the $k^{th}$ timing may be obtained through calculation by using the first positioning data of the $k^{th}$ timing and the error covariance of the predicted prior estimated value of the $k^{th}$ timing and by using the observation model.

For the positioning data processing apparatus 10, the filtering module 144 may be configured to obtain the residual of the $k^{th}$ timing through calculation by using the first positioning data of the $k^{th}$ timing and the predicted prior estimated value of the $k^{th}$ timing and by using the observation model. In addition, the filtering module 144 may be configured to obtain the error covariance of the residual of the $k^{th}$ timing through calculation by using the first positioning data of the $k^{th}$ timing and the error covariance of the predicted prior estimated value of the $k^{th}$ timing and by using the observation model.

Specifically, the residual of the $k^{th}$ timing may be calculated through the following equation:

$$\tilde{y}_k = z_k - H_k \hat{x}_{k|k-1}$$

$\tilde{y}_k$ is the residual of the position data of the moving target in the $k^{th}$ timing, and $z_k$ is the observation value of the moving target. When the residual of the $k^{th}$ timing is calculated, the observation model $H_k$ acts on the predicted prior estimated value $\hat{x}_{k|k-1}$ of the $k^{th}$ timing, and maps the predicted prior estimated value $\hat{x}_{k|k-1}$ of the $k^{th}$ timing to the same observation space as that of the observation value $z_k$, helping calculate the residual of the $k^{th}$ timing. In the calculation process, it is assumed that the observation noise is 0, and the error covariance of the observation noise is $R_k$. Specifically, the observation value $z_k$ is the first position data of the $k^{th}$ timing of the moving target in the GPS positioning data, that is, $$z_k = \begin{pmatrix} m_k \\ n_k \end{pmatrix}$$

$m_k$ and $n_k$ are respectively a longitude and a latitude of the moving target in the $k^{th}$ timing.

Further, the error covariance of the residual of the $k^{th}$ timing may be calculated through the following equation:

$$S_k = R_k + H_k P_{k|k-1} H_k^T$$

$S_k$ is the error covariance of the residual $\tilde{y}_k$ of the position data of the moving target in the $k^{th}$ timing. The error covariance $R_k$ of the observation noise of the $k^{th}$ timing is determined according to positioning accuracy of the first positioning data of the $k^{th}$ timing of the GPS.

$$R_k = \begin{bmatrix} p_k * p_k & 0 \\ 0 & p_k * p_k \end{bmatrix}$$

$p_k$ is positioning accuracy of GPS positioning data of the $k^{th}$ timing.

In some implementations, the Kalman gain of the $k^{th}$ timing may be obtained through calculation by using the first position data of the $k^{th}$ timing, the predicted prior estimated value of the $k^{th}$ timing, and the error covariance of the predicted prior estimated value of the $k^{th}$ timing. Further, the Kalman gain of the $k^{th}$ timing may be obtained through calculation by using the error covariance of the predicted prior estimated value of the $k^{th}$ timing and the error covariance of the residual of the $k^{th}$ timing and by using the observation model.

For the positioning data processing apparatus 10, the filtering module 144 may be configured to obtain the Kalman gain of the $k^{th}$ timing through calculation by using the first position data of the $k^{th}$ timing, the predicted prior estimated value of the $k^{th}$ timing, and the error covariance of the predicted prior estimated value of the $k^{th}$ timing and by using the foregoing Kalman model and equation, and the observation model. Further, the filtering module 144 may be configured to obtain the Kalman gain of the $k^{th}$ timing through calculation by using the error covariance of the predicted prior estimated value of the $k^{th}$ timing and the error covariance of the residual of the $k^{th}$ timing and by using the observation model.

Specifically, the Kalman gain of the $k^{th}$ timing may be calculated through the following equation:

$$K_k = P_{k|k-1} H_k^T S_k^{-1}$$

$K_k$ is the Kalman gain of the position data of the moving target in the $k^{th}$ timing.

In some implementations, the optimal estimated value of the $k^{th}$ timing may be obtained through calculation by using the first position data of the $k^{th}$ timing, the predicted prior estimated value of the $k^{th}$ timing, and the Kalman gain of the $k^{th}$ timing. Further, the optimal estimated value of the $k^{th}$ timing may be obtained through calculation by using the predicted prior estimated value of the $k^{th}$ timing, the Kalman gain of the $k^{th}$ timing, and the residual of the $k^{th}$ timing.

The error covariance of the optimal estimated value of the $k^{th}$ timing may be obtained through calculation by using the error covariance of the predicted prior estimated value of the $k^{th}$ timing and the Kalman gain of the $k^{th}$ timing.

For the positioning data processing apparatus 10, the filtering module 144 may be configured to obtain the optimal estimated value of the $k^{th}$ timing through calculation by using the first position data of the $k^{th}$ timing, the predicted prior estimated value of the $k^{th}$ timing, and the Kalman gain of the $k^{th}$ timing. The output unit 16 may output the optimal estimated value of the $k^{th}$ timing as the second positioning data of the $k^{th}$ timing. The optimal estimated value of the $k^{th}$ timing may be used for filtering processing on the first positioning data of a subsequent timing.

The filtering module 144 may be configured to obtain the error covariance of the optimal estimated value of the $k^{th}$ timing through calculation by using the error covariance of the predicted prior estimated value of the $k^{th}$ timing and the Kalman gain of the $k^{th}$ timing. The error covariance of the optimal estimated value of the $k^{th}$ timing may be used for filtering processing on the first positioning data of the subsequent timing.

Specifically, the optimal estimated value of the $k^{th}$ timing may be calculated through the following equation:

$$\hat{x}_{k|k} = \hat{x}_{k|k-1} + K_k \tilde{y}_k$$

$\hat{x}_{k|k}$ is the optimal estimated value of the $k^{th}$ timing of the moving target.

Further, the error covariance of the optimal estimated value of the $k^{th}$ timing may be calculated through the following equation:

$$P_{k|k} = (I - K_k H_k) P_{k|k-1} (I - K_k H_k)^T + K_k R_k K_k^T$$

$P_{k|k}$ is the error covariance of the optimal estimated value $\hat{x}_{k|k}$ of the $k^{th}$ timing of the moving target, and I is an identity matrix.

In the implementations of this application, when filtering processing is performed on the first position data of the $k^{th}$ timing, the obtained optimal estimated value may be regarded as second position data of the $k^{th}$ timing of the moving target, so that the output unit 16 may output the optimal estimated value as the second positioning data. In the chronological recursive process, after filtering processing is performed on the j pieces of first positioning data generated in the j timings, the output unit 16 may output to obtain j pieces of second positioning data in the j timings, that is, output the second positioning data sequence of the moving target.

In the foregoing implementations, the processing unit 14 may determine the error covariance of the optimal estimated value of the first timing and the error covariance of the observation noise according to the positioning accuracy of the GPS positioning data, then recursively calculate the error covariance of the predicted prior estimated value of the subsequent timing according to the error covariance of the optimal estimated value of the first timing, and calculate, according to the observation noise of each timing and the error covariance of the predicted prior estimated value of each timing, the error covariance of the optimal estimated value of the corresponding timing.

In some implementations, the first positioning data includes at least one of positioning accuracy, positioning signal strength, and a quantity of positioning satellites. The error covariance of the predicted prior estimated value and the error covariance of the optimal estimated value of each timing may be calculated according to at least one of the positioning accuracy, the positioning signal strength, and the quantity of positioning satellites.

That is, the processing unit 14 may further determine the error covariance of the optimal estimated value and the error covariance of the observation noise of the first timing in the first positioning data sequence by using the positioning signal strength or the quantity of positioning satellites, or determine the error covariance of the optimal estimated value and the error covariance of the observation noise of the first timing in the first positioning data sequence by using a combination of two or more of the positioning accuracy, the positioning signal strength, and the quantity of positioning satellites. Further, the error covariance of the predicted prior estimated value of the subsequent timing is recursively calculated according to the error covariance of the optimal estimated value of the first timing, and the error covariance of the optimal estimated value of the corresponding timing is calculated according to the observation noise of each timing and the error covariance of the predicted prior estimated value of each timing.

It may be understood that, in a navigation scenario, the positioning data processing apparatus 10 generally may set a planned route for the moving target before navigation. Therefore, the adsorption module 142 may be configured to determine whether the position corresponding to the second positioning data of the $k^{th}$ timing deviates from the planned route, to navigate for the moving target, so that the moving target moves along the planned route.

In some implementations, for the second positioning data of the first timing, the adsorption module 142 may be configured to determine whether the position corresponding to the second positioning data of the first timing deviates from the planned route. The adsorption data of the first timing may be obtained through adsorption calculation by using the filtered data of the first timing in a case that the position corresponding to the second positioning data of the first timing does not deviate from the planned route.

For the positioning data processing apparatus 10, the adsorption module 142 is configured to perform adsorption calculation by using the filtered data of the first timing to obtain the adsorption data of the first timing in a case that the position corresponding to the second positioning data of the first timing does not deviate from the planned route.

Specifically, in a navigation scenario, the obtaining unit 12 obtains a positioning data sequence generated by a moving target chronologically after the navigation is enabled. Before the navigation is enabled, a planned route may be preset. After the navigation is enabled, it is determined whether the position corresponding to the second positioning data in the first timing deviates from the planned route. In this way, when the navigation is enabled, a navigation error caused by the position of the first timing of the moving target deviating from the planned route can be avoided.

In some implementations, in a case that the position corresponding to the second positioning data of the first timing deviates from the planned route, the planned route is updated according to the filtered data of the first timing.

For the positioning data processing apparatus 10, the adsorption module 142 is configured to update the planned route according to the filtered data of the first timing in a case that the position corresponding to the second positioning data of the first timing deviates from the planned route.

In some implementations, the adsorption data of the $k^{th}$ timing may be obtained through adsorption calculation by using the filtered data of the $k^{th}$ timing in a case that the position corresponding to the second positioning data of the $k^{th}$ timing does not deviate from the planned route.

For the positioning data processing apparatus 10, the adsorption module 142 is configured to perform adsorption calculation by using the filtered data of the $k^{th}$ timing to obtain the adsorption data of the $k^{th}$ timing in a case that the position corresponding to the second positioning data of the $k^{th}$ timing does not deviate from the planned route.

When the position corresponding to the second positioning data of the $k^{th}$ timing does not deviate from the planned route, it may be considered that the position of the moving target in the $k^{th}$ timing is on the planned route. In this case, a corresponding position of the second positioning data of the $k^{th}$ timing on the planned route is calculated to obtain the adsorption data of the $k^{th}$ timing. The adsorption data of the $k^{th}$ timing may be used as a control input of the predicted prior estimated value of the subsequent timing, that is, used to correct the Kalman filtering algorithm to perform filtering processing on the first positioning data of the subsequent timing.

In some implementations, the adsorption data of the $k^{th}$ timing may be obtained through adsorption calculation by using the optimal estimated value of the $k^{th}$ timing.

For the positioning data processing apparatus 10, the adsorption module 142 may be configured to perform adsorption calculation by using the optimal estimated value of the $k^{th}$ timing to obtain the adsorption data of the $k^{th}$ timing.

It may be understood that, the optimal estimated value of the $k^{th}$ timing is outputted by the output unit 16 to obtain the second positioning data of the $k^{th}$ timing. In other implementations, the adsorption data of the $k^{th}$ timing may be obtained through adsorption calculation by using the second positioning data of the $k^{th}$ timing. Correspondingly, the adsorption module 142 is configured to perform adsorption calculation by using the second positioning data of the $k^{th}$ timing to obtain the adsorption data of the $k^{th}$ timing. Similarly, the corresponding position of the second positioning data of the $k^{th}$ timing on the planned route may be obtained through adsorption calculation.

In some implementations, in a case that the position corresponding to the second positioning data of the $k^{th}$ timing deviates from the planned route, the planned route is updated according to the second positioning data of the $k^{th}$ timing.

For the positioning data processing apparatus 10, the adsorption module 142 may be configured to update the planned route according to the position corresponding to the second positioning data of the $k^{th}$ timing in a case that the position corresponding to the second positioning data of the $k^{th}$ timing of the moving target deviates from the planned route. In this way, the planned route may be updated in real time when the moving target deviates from the planned route, to ensure that the moving target can reach the target position in the navigation process.

When the planned route is updated, the planned route is re-determined by using the position corresponding to the second positioning data as a starting point.

Specifically, the second positioning data of a plurality of consecutive timings is collected, to determine whether the second positioning data of the $k^{th}$ timing deviates from the planned route. If positions corresponding to the second positioning data of the plurality of timings all deviate from the planned route, it may be considered that the moving target deviates from the planned route, and then the planned route is updated according to the position corresponding to the second positioning data of the $k^{th}$ timing.

Figure 7:
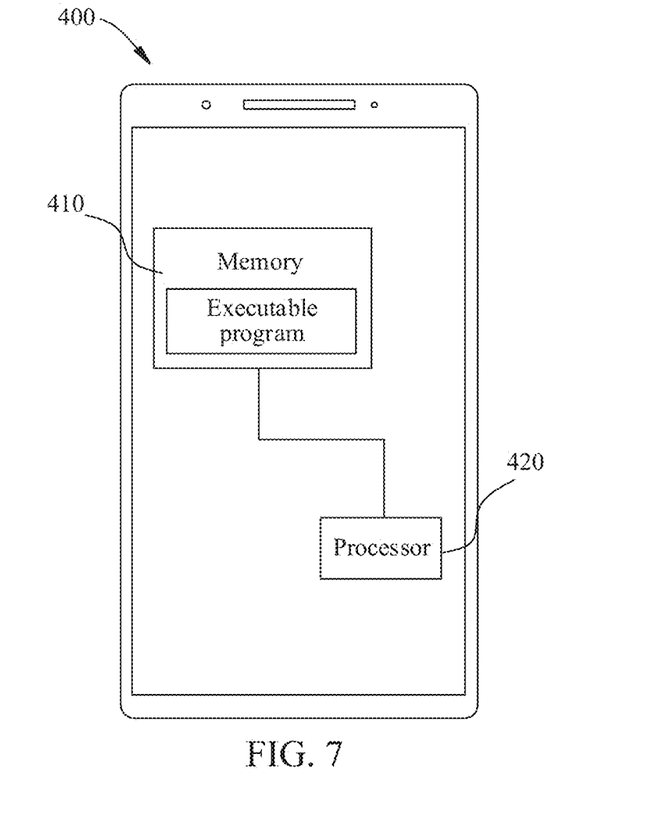
FIG. 7 is a schematic diagram of modules of a terminal device according to an implementation of this application.

Referring to FIG. 7, a terminal device 400 in the implementations of this application includes a memory 410 and a processor 420, the memory 410 stores an executable program, and when the executable program is executed by the processor 420, the processor 420 performs the positioning data processing method according to any one of the foregoing implementations.

For example, when the executable program is executed by the processor 420, the processor 420 may perform the following steps:

Step S1: Obtain a first positioning data sequence generated by a moving target chronologically.

Step S2: Perform filtering processing on the first positioning data sequence according to a preset filtering algorithm to obtain a filtered data sequence, and perform adsorption calculation on the filtered data sequence to obtain an adsorption data sequence, the preset filtering algorithm being an algorithm obtained after a Kalman filtering algorithm is corrected according to the adsorption data sequence.

Step S3: Output the filtered data sequence to obtain a second positioning data sequence of the moving target.

Step S4: Display a position corresponding to second positioning data in the second positioning data sequence.

In this embodiment of this application, the processor 420 may further perform the following step: displaying the position corresponding to the second positioning data in the second positioning data sequence.

In the foregoing terminal device, the processor 420 performs the positioning data processing method according to any one of the foregoing implementations to implement positioning and navigation of the moving target. The adsorption data sequence is used to correct the Kalman filtering algorithm. In the process of chronological recursive calculation, the second positioning data sequence of the moving target may be obtained, so that a positioning offset of the moving target is eliminated to some extent, and in particular, an impact of error accumulation caused by the slow positioning offset is eliminated, so that the position corresponding to the second positioning data in the second positioning data sequence accurately reflects an actual position of the moving target, thereby improving accuracy of positioning and navigation, and improving user satisfaction with the terminal device 400.

In some implementations, the terminal device 400 may be the foregoing terminal 100. The terminal device 400 may be in communication connection with the positioning system 200 and the server 300 to form a navigation system.

In some implementations, the foregoing positioning data processing apparatus 10 may be disposed in the terminal device 400. Specifically, the positioning data processing apparatus 10 may be an independent functional component of the terminal device 400, or some functional modules of the positioning data processing apparatus 10 may be implemented by the processor 420, or all functional modules of the positioning data processing apparatus 10 are implemented by the processor 420.

In the foregoing embodiment, the positioning data processing method is implemented by the terminal device 400. In another embodiment, the method may alternatively be implemented by a server or another independent device. The server or the another independent device may have a structure similar to that shown in FIG. 7, that is, including a memory and a processor. The memory stores an executable program, and when the executable program is executed by the processor, the processor performs the positioning data processing method according to any one of the foregoing implementations.

The computer-readable storage medium in the implementations of this application stores an executable program, and when the executable program is executed by the processor 420, the processor 420 performs the positioning data processing method according to any one of the foregoing implementations.

For example, when the executable program is executed by the processor 420, the processor 420 may perform the following steps:

Step S1: Obtain a first positioning data sequence generated by a moving target chronologically.

Step S2: Perform filtering processing on the first positioning data sequence according to a preset filtering algorithm to obtain a filtered data sequence, and perform adsorption calculation on the filtered data sequence to obtain an adsorption data sequence, the preset filtering algorithm being an algorithm obtained after a Kalman filtering algorithm is corrected according to the adsorption data sequence.

Step S3: Output the filtered data sequence to obtain a second positioning data sequence of the moving target.

Step S4: Display a position corresponding to second positioning data in the second positioning data sequence.

In this embodiment of this application, the processor 420 may further perform the following step: displaying the position corresponding to the second positioning data in the second positioning data sequence.

Figure 8:
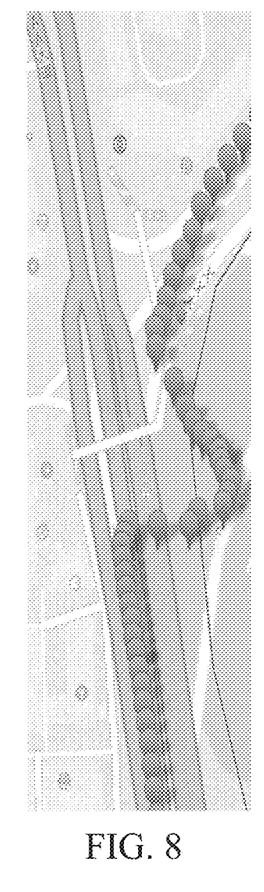
FIG. 8 is a schematic diagram of a track of a first positioning data sequence according to an implementation of this application.
Figure 9:
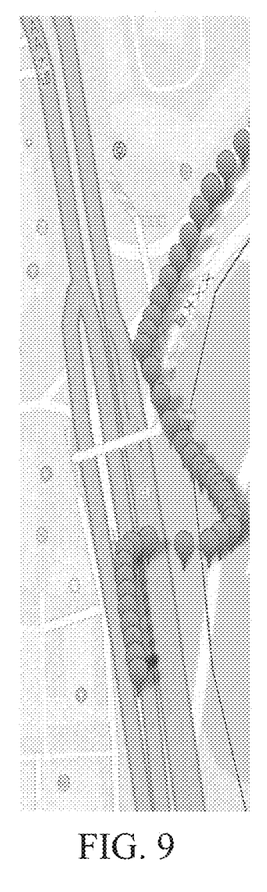
FIG. 9 is a schematic diagram of a track of a positioning data sequence outputted after the first positioning data sequence in FIG. 8 is processed by using an original Kalman algorithm.
Figure 10:
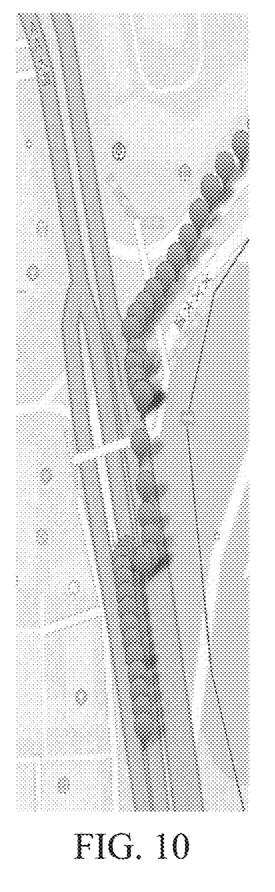
FIG. 10 is a schematic diagram of a track of a second positioning data sequence outputted after the first positioning data sequence in FIG. 8 is processed according to a positioning data processing method according to an implementation of this application.

Referring to FIG. 8, FIG. 9, and FIG. 10, each of the figures is a schematic diagram of a partial track displayed by a terminal device, including a road track and a track of positioning data. Each point in the figure represents a position corresponding to the positioning data of each timing. The points shown in FIG. 8 represent a track of a first positioning data sequence of the timings, each point in the track corresponds to first positioning data of one timing of a moving target. The points shown in FIG. 9 represent a track of a positioning data sequence obtained after filtering processing is performed on the first positioning data sequence shown in FIG. 8 by using an original Kalman filtering algorithm. The points shown in FIG. 10 represent a track of a second positioning data sequence obtained after the first positioning data sequence shown in FIG. 8 is processed by using the positioning data processing method in the implementations of this application.

As shown in FIG. 8, in the positions corresponding to the first positioning data, there is a case in which the moving target is outside the road. In practical application, especially in a driving process of a vehicle, the vehicle usually drives along the road. That is, there is noise in the first positioning data shown in FIG. 8.

As shown in FIG. 9, each point in the track of the positioning data sequence corresponds to positioning data obtained after filtering processing is performed on the first positioning data of one timing of the moving target. In the positions corresponding to the positioning data obtained after filtering processing is performed by using the original Kalman filtering algorithm, there is still the case in which the moving target is outside the road. Therefore, the original Kalman filtering algorithm fails to well eliminate the noise in the first positioning data.

As shown in FIG. 10, each point in the track of the second positioning data sequence corresponds to second positioning data of one timing of the moving target. The track in the figure can and the road can well overlap, indicating that the noise in the second positioning data is relatively small, that is, the positioning data processing method in the implementations of this application can effectively eliminate the noise in the positioning data. The track of the second positioning data sequence of the moving target that is obtained after the filtering processing matches the road track, and the position corresponding to the second positioning data in the obtained second positioning data sequence can accurately reflect an actual position of the moving target, making positioning and navigation more accurate and reliable.

In the descriptions of this specification, descriptions of reference terms such as "some implementations", "one implementation", "some implementations", "exemplary implementation", "example", "specific example" or "some examples" mean that specific characteristics, structures, materials, or features described with reference to the implementation or example are included in at least one implementation or example of this application. In this specification, schematic descriptions of the foregoing terms are not necessarily with respect to the same implementation or example. In addition, the described specific characteristics, structures, materials, or features may be combined in a proper manner in any one or more implementations or examples.

Any process or method in the flowcharts or described herein in another manner may be understood as indicating a module, a segment, or a part including code of one or more executable instructions for implementing a particular logical function or process step. In addition, the scope of preferred embodiments of this application includes other implementations which do not follow the order shown or discussed, including performing, according to involved functions, the functions basically simultaneously or in a reverse order, which is to be understood by a person skilled in the art to which the embodiments of this application belong.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In this specification, a "computer-readable medium" may be any apparatus that can include, store, communicate, propagate, or transmit the program for use by the instruction execution system, apparatus, or device or in combination with the instruction execution system, apparatus, or device. More specific examples (a non-exhaustive list) of the computer-readable medium include the following: an electrical connection (electronic device) having one or more wires, a portable computer diskette (magnetic apparatus), a random access memory (RAM), a read-only memory (ROM), an erasable programmable read-only memory (EPROM or flash memory), an optical fiber apparatus, and a portable compact disc read-only memory (CDROM). In addition, the computer readable medium may even be a piece of paper for printing the program, or another proper medium, because, for example, optical scanning may be performed on the paper or another medium, and then processing is performed by performing editing and decryption, or in another proper manner to obtain the program in an electronic manner. Then the program is stored in a computer memory.

It is to be understood that parts of this application may be implemented by using hardware, software, firmware, or combinations thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA).

A person of ordinary skill in the art may understand that all or some of the steps of the method embodiments may be implemented by a program instructing relevant hardware. The program may be stored in a computer-readable storage medium. When the program is run, one or a combination of the steps of the method embodiments is performed.

In addition, functional units in the embodiments of this application may be integrated into one processing module, or each of the units may exist alone physically, or two or more units are integrated into one module. The integrated module may be implemented in a hardware form, or may be implemented in a form of a software functional module. If implemented in the form of a software functional module and sold or used as an independent product, the integrated module may be stored in a computer-readable storage medium. The aforementioned storage medium may be a read-only memory, a magnetic disk, or an optical disc.

Although the embodiments of this application are shown and described above, it may be understood that, the foregoing embodiments are exemplary, and cannot be construed as a limitation to this application. A person of ordinary skill in the art may make changes, modifications, replacement, and variations to the foregoing embodiments within the scope of this application.

What is claimed is:

1. A positioning data processing method, performed by a computing device having a processor and memory storing a plurality of computer programs to be executed by the processor, the method comprising:
   obtaining a first positioning data sequence generated by a moving target chronologically;
   performing filtering processing on the first positioning data sequence according to a preset filtering algorithm to obtain a filtered data sequence, wherein adsorption calculation is performed on the filtered data sequence to obtain an adsorption data sequence, and the preset filtering algorithm is an algorithm obtained after a Kalman filtering algorithm is corrected according to the adsorption data sequence;
   outputting the filtered data sequence to obtain a second positioning data sequence of the moving target; and
   dynamically displaying positions of the moving target according to second positioning data in the second positioning data sequence.

2. The positioning data processing method according to claim 1, wherein the first positioning data sequence comprises a first position data sequence, and the performing filtering processing on the first positioning data sequence according to a preset filtering algorithm to obtain a filtered data sequence comprises:
   performing filtering processing on the first position data sequence according to the preset filtering algorithm to obtain the filtered data sequence; and
   performing adsorption calculation on the filtered data sequence to obtain the adsorption data sequence.

3. The positioning data processing method according to claim 1, wherein the first positioning data sequence comprises j pieces of first positioning data generated in j timings, j is a natural number greater than or equal to 2, filtered data of a $k^{th}$ timing is calculated through the Kalman filtering algorithm by using the first positioning data of the $k^{th}$ timing, the first positioning data of the $(k-1)^{th}$ timing, the filtered data of the $(k-1)^{th}$ timing, and adsorption data of the $(k-1)^{th}$ timing, and the adsorption data of the $k^{th}$ timing is obtained through the adsorption calculation by using the filtered data of the $k^{th}$ timing, wherein k is a natural number and $1 < k \leq j$.

4. The positioning data processing method according to claim 3, wherein the filtered data of the first timing is obtained by using the first positioning data of the first timing, and the adsorption data of the first timing is obtained through adsorption calculation by using the filtered data of the first timing.

5. The positioning data processing method according to claim 3, wherein the filtered data comprises an optimal estimated value and an error covariance of the optimal estimated value, and the second positioning data sequence is obtained by sequentially outputting the optimal estimated value of each timing.

6. The positioning data processing method according to claim 5, wherein the first positioning data comprises first position data, and the filtered data comprises a predicted prior estimated value, an error covariance of the predicted prior estimated value, and a Kalman gain,
   the predicted prior estimated value of the kth timing is obtained through calculation by using the first position data of the (k−1)th timing, the optimal estimated value of the (k−1)th timing, and the adsorption data of the (k−1)th timing,
   the error covariance of the predicted prior estimated value of the kth timing is obtained through calculation by using the error covariance of the optimal estimated value of the (k−1)th timing,
   the Kalman gain of the kth timing is obtained through calculation by using the first position data of the kth timing, the predicted prior estimated value of the kth timing, and the error covariance of the predicted prior estimated value of the kth timing,
   the optimal estimated value of the kth timing is obtained through calculation by using the first position data of the kth timing, the predicted prior estimated value of the kth timing, and the Kalman gain of the kth timing, and
   the error covariance of the optimal estimated value of the kth timing is obtained through calculation by using the error covariance of the predicted prior estimated value of the kth timing and the Kalman gain of the kth timing.

7. The positioning data processing method according to claim 6, wherein the adsorption data of the kth timing is obtained through adsorption calculation by using the optimal estimated value of the kth timing.

8. The positioning data processing method according to claim 6, wherein the first positioning data comprises at least one of positioning accuracy, positioning signal strength, and a quantity of positioning satellites, and the error covariance of the predicted prior estimated value and the error covariance of the optimal estimated value of each timing are calculated by using at least one of the positioning accuracy, the positioning signal strength, and the quantity of positioning satellites.

9. The positioning data processing method according to claim 1, wherein the second positioning data sequence comprises j pieces of second positioning data obtained in j timings, j is a natural number greater than or equal to 2, and adsorption data of the kth timing is obtained through adsorption calculation by using the filtered data of the kth timing in a case that a position corresponding to the second positioning data of the kth timing does not deviate from a planned route, wherein k is a natural number and $1 \leq k \leq j$.

10. The positioning data processing method according to claim 9, wherein the planned route is updated according to the second positioning data of the kth timing in a case that the position corresponding to the second positioning data of the kth timing deviates from the planned route.

11. A computing device, comprising a memory and a processor, the memory storing a plurality of computer programs, the plurality of computer programs, when executed by the processor, causing the processor to perform a plurality of operations including:
    obtaining a first positioning data sequence generated by a moving target chronologically;
    performing filtering processing on the first positioning data sequence according to a preset filtering algorithm to obtain a filtered data sequence, wherein adsorption calculation is performed on the filtered data sequence to obtain an adsorption data sequence, and the preset filtering algorithm is an algorithm obtained after a Kalman filtering algorithm is corrected according to the adsorption data sequence;
    outputting the filtered data sequence to obtain a second positioning data sequence of the moving target; and
    dynamically displaying positions of the moving target according to second positioning data in the second positioning data sequence.

12. The computing device according to claim 11, wherein the first positioning data sequence comprises a first position data sequence, and the performing filtering processing on the first positioning data sequence according to a preset filtering algorithm to obtain a filtered data sequence comprises:
    performing filtering processing on the first position data sequence according to the preset filtering algorithm to obtain the filtered data sequence; and
    performing adsorption calculation on the filtered data sequence to obtain the adsorption data sequence.

13. The computing device according to claim 11, wherein the first positioning data sequence comprises j pieces of first positioning data generated in j timings, j is a natural number greater than or equal to 2, filtered data of a $k^{th}$ timing is calculated through the Kalman filtering algorithm by using the first positioning data of the $k^{th}$ timing, the first positioning data of the $(k-1)^{th}$ timing, the filtered data of the $(k-1)^{th}$ timing, and adsorption data of the $(k-1)^{th}$ timing, and the adsorption data of the $k^{th}$ timing is obtained through the adsorption calculation by using the filtered data of the $k^{th}$ timing, wherein k is a natural number and $1<k\leq j$.

14. The computing device according to claim 13, wherein the filtered data of the first timing is obtained by using the first positioning data of the first timing, and the adsorption data of the first timing is obtained through adsorption calculation by using the filtered data of the first timing.

15. The computing device according to claim 13, wherein the filtered data comprises an optimal estimated value and an error covariance of the optimal estimated value, and the second positioning data sequence is obtained by sequentially outputting the optimal estimated value of each timing.

16. The computing device according to claim 11, wherein the second positioning data sequence comprises j pieces of second positioning data obtained in j timings, j is a natural number greater than or equal to 2, and adsorption data of the kth timing is obtained through adsorption calculation by using the filtered data of the kth timing in a case that a position corresponding to the second positioning data of the kth timing does not deviate from a planned route, wherein k is a natural number and $1\leq k\leq j$.

17. A non-transitory computer-readable storage medium, storing a plurality of computer programs that, when executed by a processor of a computing device, causing the computing device to perform a plurality of operations including:
    obtaining a first positioning data sequence generated by a moving target chronologically;
    performing filtering processing on the first positioning data sequence according to a preset filtering algorithm to obtain a filtered data sequence, wherein adsorption calculation is performed on the filtered data sequence to obtain an adsorption data sequence, and the preset filtering algorithm is an algorithm obtained after a Kalman filtering algorithm is corrected according to the adsorption data sequence;
    outputting the filtered data sequence to obtain a second positioning data sequence of the moving target; and
    dynamically displaying positions of the moving target according to second positioning data in the second positioning data sequence.

18. The non-transitory computer-readable storage medium according to claim 17, wherein the first positioning data sequence comprises a first position data sequence, and the performing filtering processing on the first positioning data sequence according to a preset filtering algorithm to obtain a filtered data sequence comprises:
    performing filtering processing on the first position data sequence according to the preset filtering algorithm to obtain the filtered data sequence; and
    performing adsorption calculation on the filtered data sequence to obtain the adsorption data sequence.

19. The non-transitory computer-readable storage medium according to claim 17, wherein the first positioning data sequence comprises j pieces of first positioning data generated in j timings, j is a natural number greater than or equal to 2, filtered data of a $k^{th}$ timing is calculated through the Kalman filtering algorithm by using the first positioning data of the $k^{th}$ timing, the first positioning data of the $(k-1)^{th}$ timing, the filtered data of the $(k-1)^{th}$ timing, and adsorption data of the $(k-1)^{th}$ timing, and the adsorption data of the $k^{th}$ timing is obtained through the adsorption calculation by using the filtered data of the $k^{th}$ timing, wherein k is a natural number and $1<k\leq j$.

20. The non-transitory computer-readable storage medium according to claim 17, wherein the second positioning data sequence comprises j pieces of second positioning data obtained in j timings, j is a natural number greater than or equal to 2, and adsorption data of the kth timing is obtained through adsorption calculation by using the filtered data of the kth timing in a case that a position corresponding to the second positioning data of the kth timing does not deviate from a planned route, wherein k is a natural number and $1\leq k\leq j$.

* * * * *